March 18, 1969 R. A. DE ROSE 3,434,095
PROGRAMMING SWITCH
Filed April 17, 1967
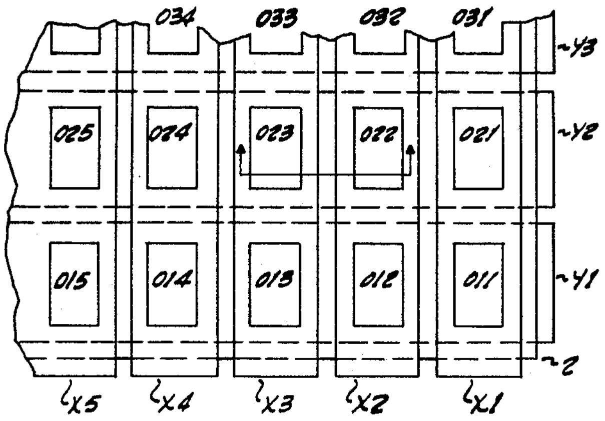
FIG. 1
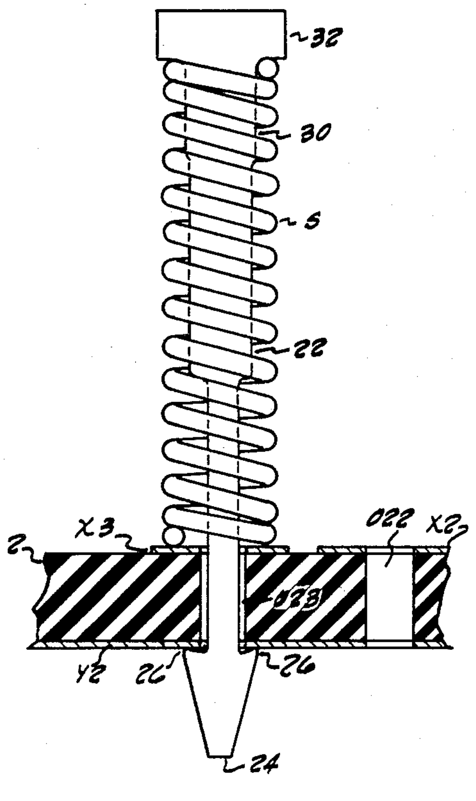
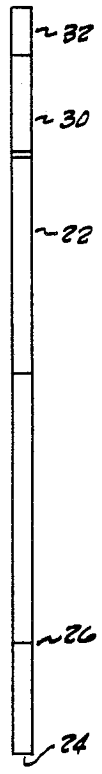
FIG. 3
FIG. 2
INVENTOR
RALPH A. DeROSE
BY
Delbert P. Warner
ATTORNEY United States Patent Office 3,434,095

Patented Mar. 18, 1969

3,434,095
PROGRAMMING SWITCH

Ralph A. DeRose, Villa Park, Ill., assignor to International Telephone and Telegraph Corp., New York, N.Y., a corporation of Maryland Filed Apr. 17, 1967, Ser. No. 631,434

U.S. Cl. 339—18 6 Claims

Int. Cl. H05k *1/04;* H01r *13/38*

ABSTRACT OF THE DISCLOSURE

A programming switch or connector is supplied for interconnecting conductors on opposite faces of printed circuit boards. Arrow shaped conductors fitted with coiled springs are pushed through elongated holes in printed circuit boards against the tension of the spring and then turned so that the barbs of the arrowheads engage a conductor on one side of the board while the coiled spring interconnects the arrow and a conductor on the other side of the board.

A related invention is that of Joseph Leibowitz entitled "Programming Switch," filed as United States patent application No. 437,868 on Mar. 8, 1965, and now Patent No. 3,349,362 and assigned to the International Telephone and Telegraph Corporation.

The present invention relates to the formation of adjustable conductor matrices and more specifically to means for making changeable interconnections between conductors on opposite faces of printed circuit boards by means of movable connector elements.

A number of switches or connectors are available for use in interconnecting conductors on opposite faces of a printed circuit board. Such interconnections establish matrices of electrical paths through the conducting strips. Generally, such switches include spring contacts which are fastened to the conducting strips and which are then selectively connected to each other by the insertion of suitable conducting bodies. These prior art devices have inherent disadvantages includingrelatively large size, high cost, excessive weight, and relative inflexibility in use. Size is related to inflexibility and is evidenced by the difficulty of changing them from one setting to another and thus of changing programs in a matrix.

It is a primary object of the present invention to provide a programming switch which makes possible quick changes in programs, i.e. in connections between conductors forming an electrical matrix; and it is a further object of the invention to afford a construction enabling reductions in the weight, size and cost of a conductor matrix and associated switch means.

The foregoing objects and others ancillary thereto may preferably be accomplished by providing a perforated insulating board with conductive strips on opposite faces. Arrow-shaped conductors, supporting springs at one end, are placed through slotted perforations in the board and turned to engage conductive strips on opposite sides of the insulating board. In a preferred embodiment, the arrow-shaped conductors are flat stampings of conductive material having protrusions in the form of barbs at one end which fit through the long dimension of slot-like perforations and which, when turned engage a conductive strip at the edge of the narrow dimensions of the slot. Simultaneously with engagement of a conductive strip on one side by the barbs, a spring is biased to provide for conduction between the other end of the conductor and a conductive strip on the other side of the insulating board. The arrow-shaped conductor and spring in combination may be used to connect any two conductors having the proper spacing, however, the assembly of arrow and spring is intended to have particular application to arrays of conductors on opposite faces of a printed circuit board. Applied through openings in a printed circuit board and then twisted, the assembly can be used to make contact between any two conductors on the faces of the printed circuit board. In this way, a plurality of such assemblies can be used to establish a matrix of conductors, or a program, between various terminals connected to the conductors. Such a matrix, or program, can be quickly modified by changing the position of one or more assemblies.

The novel features that I consider to be characteristic of my invention are set forth with particularity in the appended claims. The invention itself, however, both as to its organization and its method of operation, together with additional objects and advantages thereof, will be best understood from the following description of a specific embodiment when read in connection with the accompanying drawings, in which:

FIG. 1 is a plan view of part of a printed circuit board having a plurality of conductors and openings, which may be employed in the practice of this invention;

FIG. 2 is a sectional view, on an enlarged scale, of parts of FIG. 1 and includes a side view of a connector made in accordance with the invention; and FIG. 3 is a side view of the connector shown in FIG. 2.

Attention is directed to FIG. 1 for a representation of a printed circuit board of use in the practice of this invention. In FIG. 1, an insulating board 2 is shown, on the faces of which are mounted a plurality of conductor strips X1, X2, X3 . . . and Y1, Y2, Y3 . . . which thus form two arrays of conductors on opposite faces of the insulating board. In order to enable the connection of desired X and Y conductors, rectangular openings 011, 012 . . . 015 . . . 021, 022 . . . 025 . . . 031 . . . 034 . . . are cut through the conductors in the insulating board.

Connections between desired X and Y conductive strips in FIG. 1 can be made by passing connectors through appropriate openings and fastening their ends to respective X and Y conductive strips. A connector which has proven very successful and which constitutes an embodiment of a major portion of the invention is shown in FIG. 2. An enlarged view of a section of the board 2 of FIG. 1 is also shown in FIG. 2 to illustrate the relationship of a typical connector to rectangular openings such as 022 and 023 of FIG. 1.

The view of the invention embodied in the connector, shown in FIG. 2 shows that conductors such as X3, arrayed on one side of an insulating base 2, can be quickly and securely connected to conductors such as Y2 on the opposite side of the same insulating base. By making a number of such connections with a plurality of conductors it is possible to program a conducting matrix incorporating conductors on opposite sides of an insulating body.

The connector shown in the sectional view of FIG. 2 is arrow-shaped with a shaft 22 of varying width, a point 24 and barbs 26. In the view shown in FIG. 2, the barbs 26 engage the conductor Y2 while a spring S is in contact with the conductor X3 and the shaft 22. The spring S, the shaft 22 and the barbs 26 are made of conductive material so that in the configuration illustrated an electrical connection is complete between the conductors X3 and Y2. The use of two barbs is advantageous, both as means for retaining the spring and as a dual contact which greatly increases the likelihood of a good contact over the probability which would prevail if there were only one contact element. The spring S also assures a high probability of establishing and maintaining good contacts through its many contact points with X3. Rubbing action, at the time the connector is moved, between the barbs in contact with conductor Y2 and the spring in contact with conductor X3 serves to provide clean areas at the points of contact. The spring serves to keep the contacts closed and prevent any bounce or mechanical oscillations.

The shaft 22, point 24 and barbs 26 are preferably made from a single flat piece of metal which is thin enough to fit through the narrow dimensions of the rectangular openings cut through the insulating base 2 of FIG. 1 and FIG. 2. The spacing between the ends of the barbs 26 will also be short enough to fit within the long dimension of the rectangular openings while being long enough to engage conductors along the narrow dimension of the openings. The connector, therefore, may be inserted through the rectangular openings and then be turned by twisting the shaft 22, say by application of a twist at 32, against the pressure of the spring S so that it assumes the position shown in FIG. 2 with the spring S, the shaft 22 and the barbs 26 forming a good electrical connection between the conductors X3 and Y2.

The dimensions of the arrow shown in FIG. 2 and FIG. 3 are critical, but desired tolerances may readily be realized with conventional manufacturing procedures. For example, the spacing between the ends of the barbs 26 can be held to tolerances which assure good connections with the conductors on the printed circuit boards. The spring S can readily be supplied in sufficient lengths and with the required tension to enable the ready placement and adjustment of the arrows in printed circuit boards. In this connection, the spring will be of small enough inside diameter to closely fit, and even out into, the edges of the shaft at 30 to provide a number of good electrical contacts between the shaft and the spring.

The connector may be formed from a sheet of beryllium copper, Phosphor bronze or similar material of suitable thickness. Typically, a piece of metal of relatively large size will be stamped to form a number of arrows of the desired shape. The springs will then be threaded over the barbs and onto the thick portion of the shaft at 30 to abut against faces formed by 32 to form the finished connector assembly.

While the principles of the invention have been described above in connection with specific apparatus and applications, it is to be understood that this description is made only by way of example and not as a limitation on the scope of the invention.

What is claimed is:

1. A programming switch for enabling an operator to manually change connections between rows of conductors supported on opposite faces of a printed circuit board and thus to program a matrix of conductors;

said programming switch including an arrow shaped conductive body formed from a shaft having barbs at one end and a wide portion at the other end; and a spring coiled about said shaft and abutting at one end against said wide portion;

said arrow shaped body forming good electrical connections over said shaft between conductors insulated from each other and held between said barbs and said spring.

2. A programming switch substantially as claimed in claim 1, in which:

the spring is coiled about, and held in place by, an enlarged section of the shaft adjacent to the wide portion at the end of the arrow, and said enlarged section serves both to hold said spring in place and provide good electrical contact between the arrow and the spring.

3. A programming switch substantially as claimed in claim 1 and incorporating a printed circuit board which includes:

a layer of insulating material;

an array of conductors on each face of said layer; and openings cut through said layer to permit said arrow shaped body to be inserted through said layer to make desired contacts between a conductor on each side of said layer.

4. A programming switch substantially as claimed in claim 3, in which:

said openings are substantially rectangular and of a size to permit passage of the barbs when they are aligned in one direction and to prevent their passage when they are aligned in another direction.

5. A programming switch substantially as claimed in claim 4, in which:

the barbs on said arrow shaped body, after insertion through one of said openings, respond to a twist on the wide portion at the end of the arrow to engage and grip conductors on the opposite faces of said layer, and said spring provides tension to hold the barbs firmly in place.

6. A programming switch substantially as claimed in claim 3, in which:

the arrays of conductors on the faces of said layer comprise rows of conductors aligned so that conductors on one face an angle with conductors on the other.

References Cited

UNITED STATES PATENTS

| | | | |
|---|---|---|---|
| 1,172,813 | 2/1916 | McCoy | 151—17 |
| 1,603,159 | 10/1926 | Synder | 292—62 |
| 2,963,626 | 2/1960 | Du Val et al. | |
| 2,972,727 | 2/1961 | Flanagan et al. | 339—95 XR |
| 3,045,077 | 7/1962 | Knanishu. | |
| 3,209,308 | 9/1965 | Aquillon | 339—17 XR |
| 3,343,118 | 9/1967 | Holzer | 339—17 |

MARVIN A. CHAMPION, *Primary Examiner.*

PATRICK A. CLIFFORD, *Assistant Examiner.*

U.S. Cl. X.R.

339—17, 255; 24—221; 85—5